United States Patent Office 3,309,374
Patented Mar. 14, 1967

3,309,374
PROCESS FOR THE PREPARATION OF
AMIDINE SALTS
Frederic Charles Schaefer, Darien, Conn., assignor to
American Cyanamid Company, Stamford, Conn., a corporation of Maine
No Drawing. Filed Apr. 21, 1964, Ser. No. 361,584
10 Claims. (Cl. 260—296)

This application is a continuation-in-part of my copending application, Serial No. 70,145, filed on November 18, 1960, now abandoned.

The present invention relates to an improved process for preparing amidine salts which contain the fundamental group:

More particularly, it relates to a new and novel reaction involving a variety of nitriles with an inorganic ammonium salt to recover amidines in the form of their salts and in good yields.

Although amidine salts have been prepared in the past, no satisfactory commercial process has been reported. It has been suggested, for instance, that a nitrile and an ammonium salt can be reacted in the presence of ammonia at a temperature of at least 200° C. Amidines are prepared in overall yields of not more than 10 percent. Such a process is not conducive to commercial exploitation. Another proposed method involves the reaction of nitriles with ammonium benzene-sulfonate at fusion temperatures in excess of 225° C. Such reaction temperatures are exceedingly high and therefore, a process involving elevated temperatures above 200° C. is wholly unattractive. Still another method for preparing amidine salts involves the reaction of aromatic nitriles with ammonium thiocyanate at elevated temperatures. This process has not met with universal acceptance, for the principal reasons that (1) ammonium thiocyanate is highly corrosive, thus affecting adversely ferrous metal reaction vessels, (2) the resultant thiocyanate salts are very difficult to recover, (3) that aliphatic nitriles cannot be reacted with ammonium thiocyanate, and (4) that ammonium salts, other than ammonium thiocyanate, cannot be employed.

It is, therefore, a principal object of the present invention to provide a novel method for preparing amidine salts in a conveniently economical manner. It is a further object to provide a novel method for preparing amidine salts in a direct manner employing relatively low temperatures. Other objects and advantages will become apparent from a consideration of the following disclosure.

It has been unexpectedly found that high overall yields of amidines, hitherto unattainable, can be obtained by reacting a nitrile, an ammonium inorganic salt and ammonia at a temperature ranging from 120° C. to not more than 180° C. Surprisingly, the amidines in high yields and purity are capable of preparation employing substantially lower than fusion temperatures.

According to the process of the present invention, an ammonium salt, ammonia and a nitrile can be reacted in a straight forward manner under a positive pressure of at least about 350 p.s.i.g. at temperatures between 120° C. and 180° C. for from four to eighteen hours to obtain amidine salts in yields of from 70% to 90%. In general, any of the large variety of nitriles can be employed. Typically illustrative nitriles, $R(CN)_x$, in which $x$ is an integer from 1 to 2 and R is aliphatic, aryl, aralipahtic or pyridyl, include: acetonitrile, propionitrile, butyronitrile, adiponitrile, n-octylnitrile, lauronitrile, benzonitrile, p-chlorobenzonitrile, terephthalonitrile, phenylacetonitrile and 3-cyanopyridine.

It is an advantage of the present invention that the ammonium salts contemplated are relatively simple inorganic compounds exemplified by the following: ammonium chloride, ammonium bromide and ammonium nitrate.

Reaction between the ammonium salts and the nitriles generally occurs smoothly in the presence of added ammonia. Usually, at least equimolar amounts of the ammonium salt and the nitrile are sufficient to cause reaction, although an excess, usually from 2 to 8 mols of the ammonium salt per mol of the nitrile, may be present without adversely affecting the yield. Where ammonia is present, usually from 1 to 30 mols of ammonia per mol of the nitrile can be employed. If desired, lower aliphatic monohydric alcohols, such as methanol and ethanol, isopropanol, n-butyl alcohol, can be incorporated into the reaction medium as a solvent, particularly in the event ammonia is employed in small quantities, for instance, of from one to two mols per mol of nitrile.

Advantageously, temperatures below 200° C. may be employed. They may be widely varied between 120° C. and 180° C., although temperatures in the elevated range of from about 150° C. to 180° C. will usually be required for the ammonium chloride reaction to take place so as to obtain maximum yields of desired product. Other ammonium salts, such as ammonium bromide and ammonium nitrate, can be used over the aforementioned wider temperature range and preferably between 120° C. and 150° C. with equal beneficial results.

It has been found that superatmospheric pressure from about 350 p.s.i.g. to about 6500 p.s.i.g. can advantageously be used. Where an alcohol solvent is present, pressures in the lower range (350 to 450 p.s.i.g.) can be employed, whereas in its absence, higher pressures are used.

The following examples are presented for purposes of illustration. These are not intended to be construed as being limitative. Unless otherwise specified, the parts given are by weight.

EXAMPLE 1

To a stainless steel autoclave are added 0.2 mol of benzonitrile, 0.8 mol of ammonium chloride and 65 grams of ammonia. The mixture is heated for 18 hours at 150° C. under a pressure of about 6500 p.s.i.g. The autoclave is then cooled and the ammonia vented off. The mixture is next withdrawn from the autoclave, washed thoroughly with ether to extract unreacted benzonitrile and the ether insolubles are next extracted with hot ethanol. The latter extract is concentrated to yield the crude benzamidine hydrochloride having a melting point of 161°–163° C. A 77% yield of the benzamidine is obtained.

EXAMPLE 2

Repeating Example 1 in every material detail except that the temperature is increased to 200° C., the yield of the benzamidine compound decreases to less than 10% of theory.

EXAMPLE 3

A mixture of 0.10 mol of benzonitrile, 0.4 mol of ammonium bromide and 65 grams of ammonia is heated in a stainless steel autoclave at 122° C. for 18 hours under a pressure of about 1300 p.s.i.g. The autoclave is then cooled and ammonia is vented to the atmosphere. The mixture withdrawn is washed thoroughly with ether to extract unreacted benzonitrile, and the ether insolubles are next extracted with hot acetonitrile. The extract is concentrated to obtain crude benzamidine hydrobromide having a melting point of 85°–110° C. A yield of 75% of theory is obtained. Recrystallized benzamidine hydrobromide melted at about 110°–111° C.

EXAMPLE 4

To a stainless steel autoclave are added 0.20 mol of benzonitrile, 0.80 mol of ammonium chloride, 2 mols of ammonia and 1 mol of methyl alcohol. The mixture is heated for 18 hours at 150° C. under a pressure of 350–400 p.s.i.g. The autoclave is then cooled and the ammonia vented off. The mixture is next withdrawn from the autoclave, washed with ether and the ether insolubles are next extracted with hot ethanol. The latter extract is concentrated to yield benzamidine hydrochloride. Upon analysis, the melting point of the recovered hydrochloride is 166°–168° C. and the yield obtained is 70% of theory.

EXAMPLE 5

A mixture containing 0.20 mol of p-chlorobenzonitrile, 0.80 mol ammonium chloride and 71 grams of ammonia is added to a suitable closed vessel at a pressure between 1050 and 1250 p.s.i.g. and heated at 125° C. for a total of 18 hours. Resultant p-chlorobenzamidine hydrochloride is recovered in 72% yield utilizing the recovery method of Example 4 above, and has a melting point of 237°–239° C.

EXAMPLE 6

To a stainless steel autoclave are added 0.1 mol of 3-cyanopyridine, 0.1 mol of ammonium chloride and 90 grams of ammonia. The autoclave is heated for 17 hours at 125° C. under an elevated pressure of 1300 p.s.i.g. Resultant 3-amidinopyridine hydrochloride is recovered in 86% yield employing the technique of Example 4. Recrystallization of the product results in a compound having a melting point of 189°–190° C.

EXAMPLE 7

A mixture of 0.2 mol of propionitrile, 0.8 mol of ammonium bromide and 74 grams ammonia is added to a stainless steel autoclave at a pressure of 1675 p.s.i.g. and heated to 150° C. for 18 hours. Resultant propionamidine hydrobromide, having a melting point of 103°–105° C. is recovered in 80% yield utilizing the recovery technique of Example 1 above.

EXAMPLE 8

Substituting butyronitrile for propionitrile in the procedure of Example 7, a pressure of 1825 p.s.i.g. is developed and butyramidine hydrobromide is recovered in 83% yield. The melting point of the recovered hydrobromide is 106°–110° C.

EXAMPLE 9

To a stainless steel autoclave is added a mixture of 0.2 mol phenylacetonitrile, 0.8 mol ammonium chloride and 75 grams of ammonia. The autoclave is heated to 150° C. for 18 hours under a pressure of about 6500 p.s.i.g. The autoclave is then cooled and the ammonia vented off. The contents are extracted with ether to remove unchanged nitrile and the ether insolubles are washed with ethanol and resultant phenylacetamidine hydrochloride is obtained in 87% yields, having a melting point of 145°–147°C.

EXAMPLE 10

A mixture of 0.1 mol t-butoxyacetonitrile and 0.2 mol ammonium bromide are reacted in a stainless steel autoclave under ammonia (77 grams) for four hours at 125° C. under a pressure of 1300 p.s.i.g. The autoclave is next cooled and the ammonia vented. Extraction of the contents with ether and the treatment of the ether insolubles results in the recovery of t-butoxyacetamidine hydrochloride having a melting point of 128°–134° C. in a yield of 81% of theory.

EXAMPLE 11

A mixture of 0.1 mol terephthalonitrile, 0.8 mol ammonium chloride and 74 grams of ammonia is heated in a closed autoclave at a pressure of 1850 p.s.i.g. for 18 hours at 150° C. After cooling the autoclave and venting the ammonia, the reaction mixture is extracted with ethanol. The alcohol insoluble material is extracted with water and the amidine salt which remains undissolved is recrystallized from hot water. Resultant terephthalamidine dihydrochloride, having a melting point above 300° C. is obtained in about a 60% yield.

What is claimed is:

1. In a process for preparing amidine salts the improvement which comprises: reacting
   (1) a nitrile represented by the formula $R(CN)_x$ where $x$ is an integer from 1 to 2 and R is a radical selected from the group consisting of aliphatic, aryl, araliphatic and pyridyl,
   (2) ammonia, and
   (3) an ammonium salt selected from the group consisting of ammonium chloride and ammonium bromide,
in a mol ratio of from 1:1–30:1–8, respectively, under a superatmospheric pressure ranging from about 350 p.s.i.g. to about 6500 p.s.i.g. and at a temperature of from 120° C. to 180° C., and thereafter recovering so-formed amidine salt.

2. The process of claim 1 in which the reaction is further caried out in the presence of a lower aliphatic monohydric alcohol.

3. The process according to claim 2 in which the alcohol is methyl alcohol.

4. The process according to claim 1 in which the nitrile is propionitrile and the ammonium salt is ammonium bromide.

5. The process according to claim 1 in which the nitrile is butyronitrile and the ammonium salt is ammonium chloride.

6. The process according to claim 1 in which the nitrile is benzonitrile and the ammonium salt is ammonium bromide.

7. The process according to claim 1 in which the nitrile is phenylacetonitrile and the ammonium salt is ammonium chloride.

8. The process according to claim 1 in which the nitrile is 3-cyanopyridine and the ammonium salt is ammonium chloride.

9. The process according to claim 1 in which the nitrile is terephthalonitrile and the ammonium salt is ammonium bromide.

10. The process according to claim 1 in which the nitrile is t-butoxyacetonitrile and the ammonium salt is ammonium bromide.

References Cited by the Examiner

UNITED STATES PATENTS

| | | | |
|---|---|---|---|
| 2,450,386 | 9/1948 | Short | 260—564 |
| 2,517,468 | 8/1950 | Djerassi et al. | 260—564 |

OTHER REFERENCES

Delabay et al.: "Bull. Soc. Chem. France" (1957), pp. 714–17.

Oxley et al.: J. Chem. Soc. (1947), pp. 1110–16.

Oxley et al.: J. Chem. Soc. (1948), pp. 303–9.

Partridge et al.: "Chemical Abstracts," vol. 41, col. 5468 (1947).

Schaefer et al.: "J. Org. Chem.," vol. 27, pp. 1255–8 (1962).

Short: J. Chem. Soc. (1946), pp. 147–50.

Walker: J. Chem. Soc. (1949), pp. 1996–202.

WALTER A. MODANCE, *Primary Examiner.*

ROBERT T. BOND, *Assistant Examiner.*